April 20, 1965  J. OSTLIND ETAL  3,179,821
TIME CONTROL SWITCHING CIRCUITS
Filed April 26, 1960 5 Sheets-Sheet 1
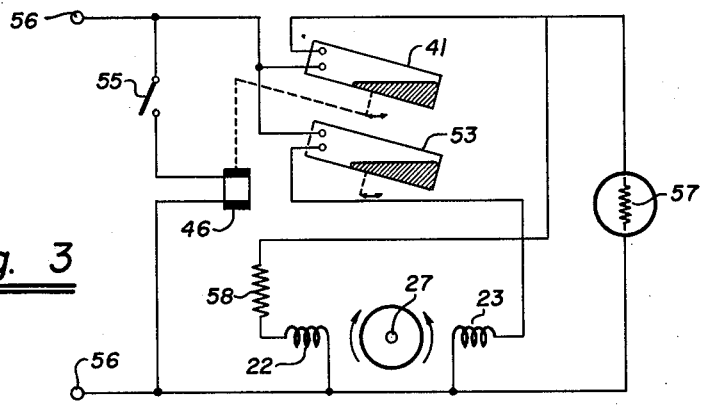
Fig. 3
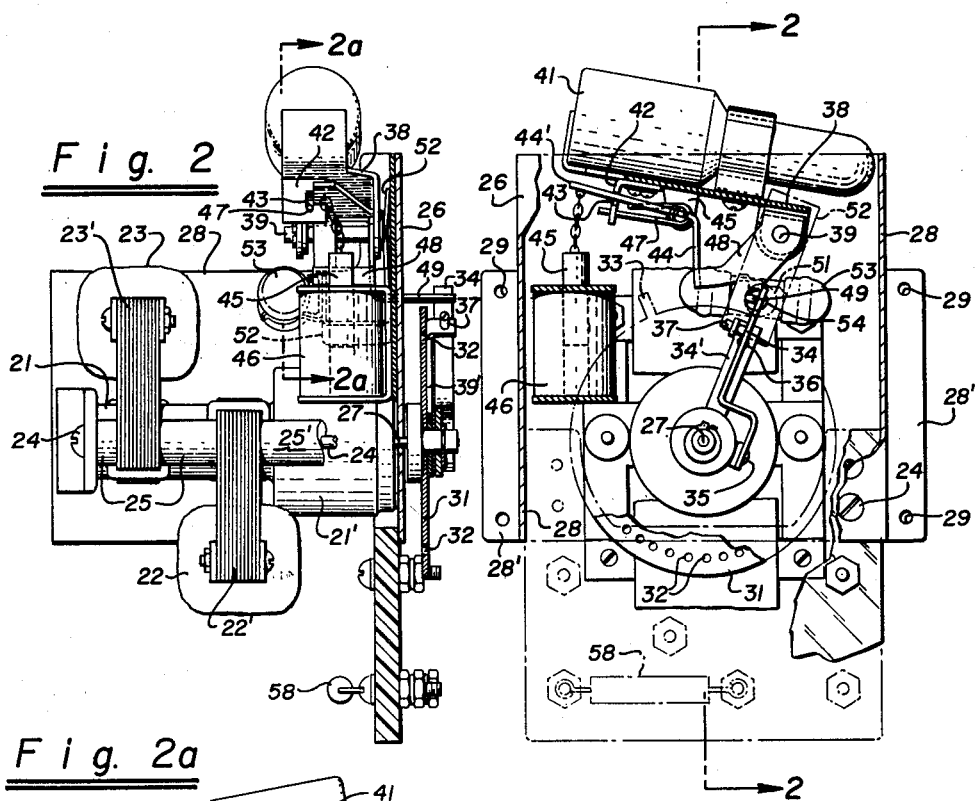
Fig. 2
Fig. 1
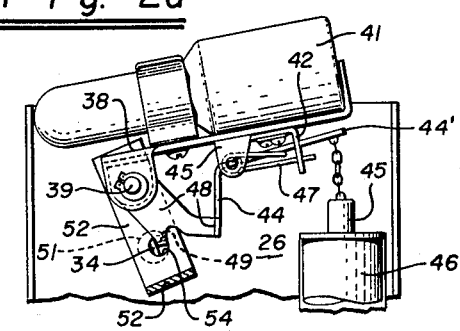
Fig. 2a
INVENTORS
BY Joel Ostlind
William Lawrence Werner
Paul B. Hunter
Attorney April 20, 1965   J. OSTLIND ETAL   3,179,821
TIME CONTROL SWITCHING CIRCUITS
Filed April 26, 1960   5 Sheets-Sheet 2

INVENTORS
BY Joel Ostlind
William Lawrence Werner
Attorney

INVENTORS
Joel Ostlind
William Lawrence Werner
BY
Attorney

April 20, 1965  J. OSTLIND ETAL  3,179,821
TIME CONTROL SWITCHING CIRCUITS
Filed April 26, 1960  5 Sheets-Sheet 4

INVENTORS
BY Joel Ostlind
William Lawrence Werner
Attorney

April 20, 1965 J. OSTLIND ETAL 3,179,821
TIME CONTROL SWITCHING CIRCUITS
Filed April 26, 1960 5 Sheets-Sheet 5
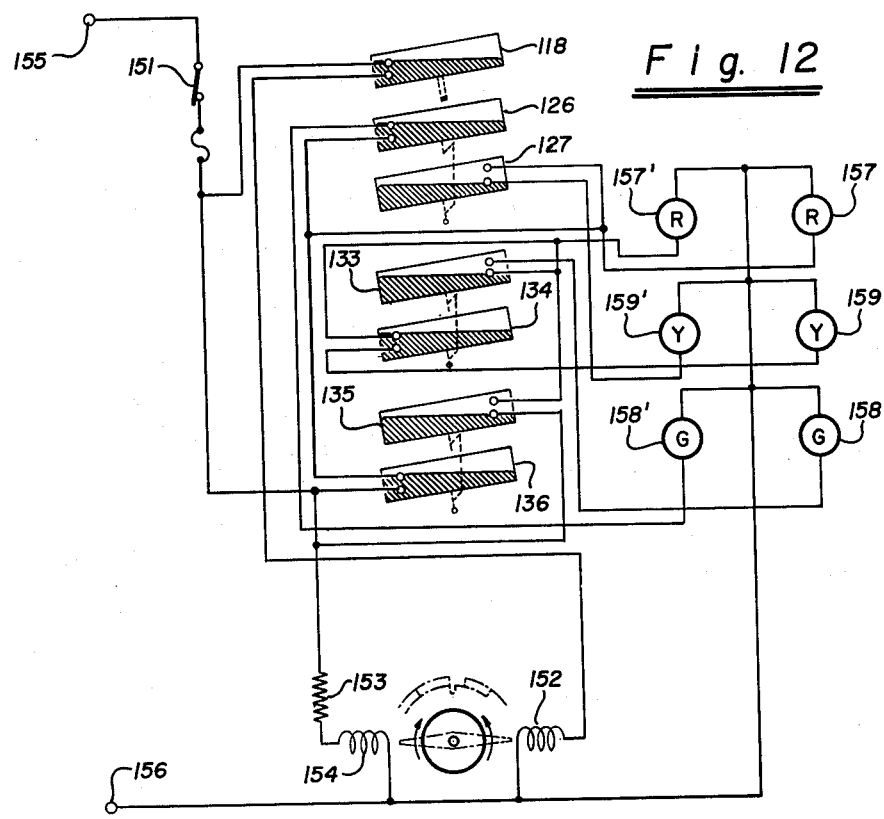
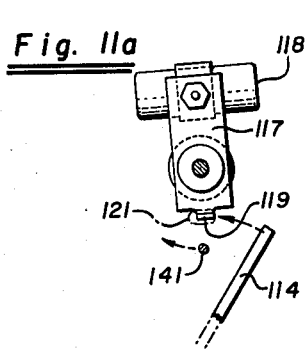
Fig. 11a
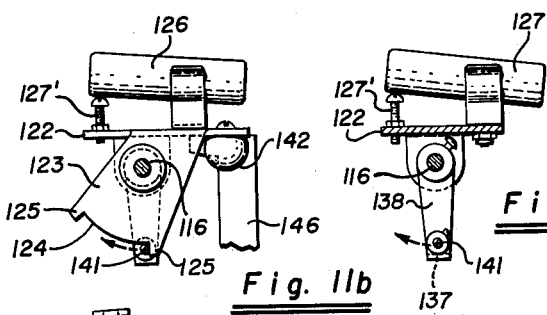
Fig. 11b
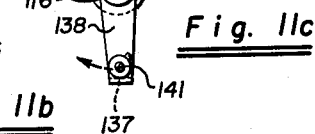
Fig. 11c
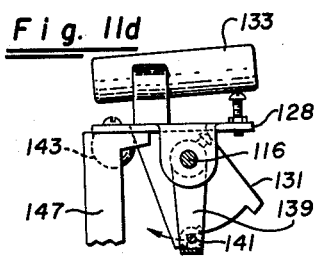
Fig. 11d
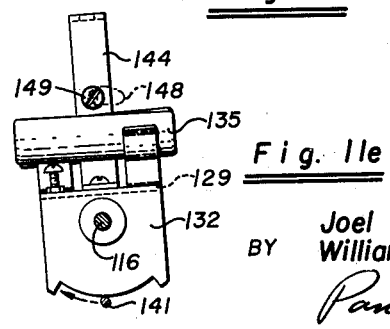
Fig. 11e
INVENTORS
Joel Ostlind
William Lawrence Werner
BY Paul B. Hunter
Attorney

United States Patent Office 3,179,821
Patented Apr. 20, 1965

3,179,821
TIME CONTROL SWITCHING CIRCUITS
Joel Ostlind and William Lawrence Werner, both of 1602 Edmonton Ave., Sunnyvale, Calif.
Filed Apr. 26, 1960, Ser. No. 24,741
14 Claims. (Cl. 307—141)

This invention relates, in general, to time controlled switching circuits, and, more particularly, to a novel time controlled switching circuit wherein a switch controlling, reversible clock motor is utilized in circuit arrangements which provide for rotation of the motor in either of its two directions by the simultaneous application of varying amounts of power at times to the two motor windings.

The invention disclosed herein is an improvement of the type of time delay switching circuits shown in the present inventors' U.S. Patents #2,557,681 and #2,605,-307 which utilize a reversible, synchronous clock motor controlling a tilting-type mercury switch tube.

These prior patents describe the useful properties of time controlled switches of the general type utilized in the present invention, especially the usefulness of mercury switch tubes and reversible clock motors for controlling the operation of the switches. The number of applications for the particular type of time delay switch described in these patents was limited and it became apparent that more refined timing variations must be provided. Thus, there was a need to supply a time control circuit mechanism that would turn on immediately and go off automatically after a pre-set time delay. Also, circuits were needed which, when energized, would delay for a predetermined interval of time before turning on and would turn off immediately when the control signal was removed. In addition, there was a need for circuits that could be operated by a continuous or maintained contact type of control; for circuits that could be actuated by a momentary contact or impulse type of control; and, still further, for circuits that involved these various combinations of the above features. In all cases, an ability to recycle immediately was necessary. It was to meet the above requirements that the invention of this present application was conceived and constructed.

It is, therefore, the object of the present invention to provide a novel, time-controlled switch mechanism wherein various combinations of time delays may be utilized in controlling various types of switching circuits, the switch mechanism having the ability to recycle immediately.

One feature of the present invention is a time controlled device employing a reversible synchronous clock motor utilized in particular circuit arrangements which provide for rotation of the motor in either of its two directions by the simultaneous application of varying amounts of power at selected times to the two motor windings.

Another feature of the present invention is the provision of a time control circuit featuring a time delay action wherein one-half of the time delay is produced by the rotation of a controlling clock motor in one direction while the second half of the time delay is produced by rotation of the clock motor in the opposite direction so that the clock motor is returned almost to normal, end of the timing-action taking place by an immediate return of the device to normal so as to be in condition for immediate recycling.

Another feature of the present invention is the provision of a novel time control circuit of the above-featured type wherein rotation in one direction is produced under less than full torque by one winding of the motor, while rotation in the other direction is produced by full torque exerted by the second winding overcoming the lesser torque by the first winding.

Still another feature of the present invention is the provision of a time controlled circuit of the above-featured type which is provided with a quick-on condition followed by a delay in turning off and an immediate recycling of the control time cycle.

Still another feature of the present invention is the provision of a time controlled circuit utilizing an overpowering reverse mechanism and a shunted resistor control providing a time delay on and a quick off condition followed by an immediate recycling operation.

Still another feature of the present invention is the provision of a recycling traffic signal control system utilizing the full torque-half torque operation of the reversible motor.

These and other features and advantages of the present invention will become more obvious upon a perusal of the following specification taken in light of the drawings wherein:

FIG. 1 is a front view, partially broken away, of one "quick on-time delay off" time controlled mechanism utilizing the present invention;

FIG. 2 is a side view, partly in cross section, of the embodiment of this invention shown in FIG. 1;

FIG. 2a is a cross-section view taken along section line 2a—2a in FIG. 2;

FIG. 3 is a circuit diagram of the time controlled mechanism shown in FIGS. 1 and 2;

FIG. 9 is a circuit showing the electrical connections of the time delay mechanism of FIGS. 7 and 8;

FIG. 10 is a front view of a time controlled circuit of the present invention which may be utilized, for example, in controlling the stop-go lights of traffic signals or the like;

Figure 10:
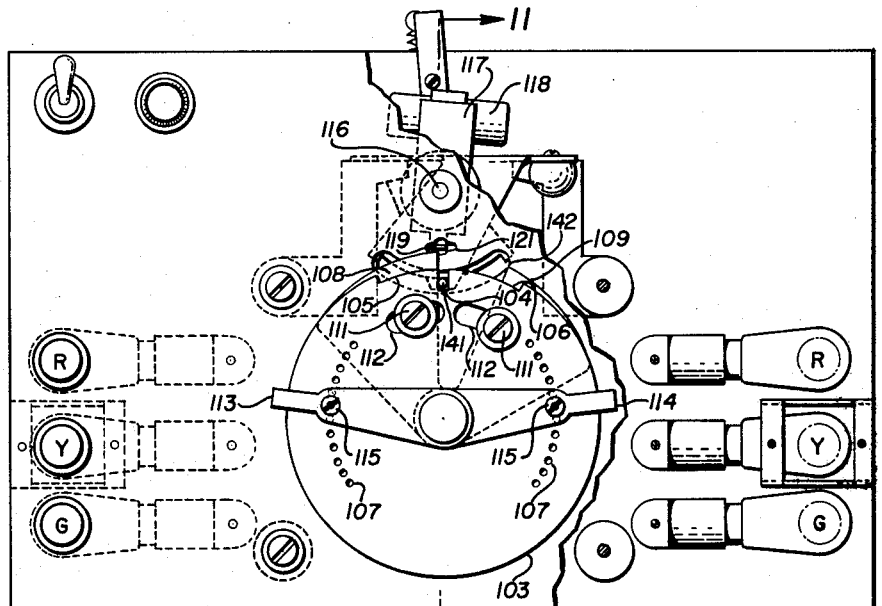
Figure 11:
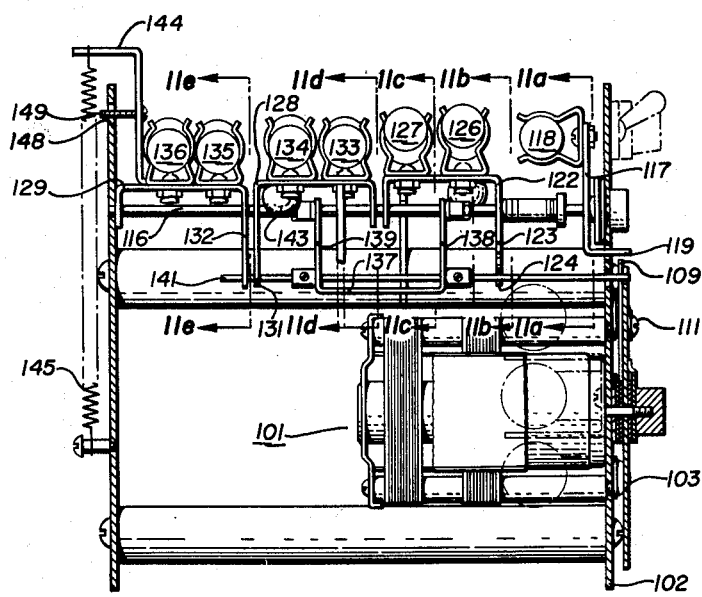
FIG. 11 is a side view of the time controlled mechanism of FIG. 10.

FIG. 11 (a) through (e) are cross-section views of the mechanism of FIGS. 10 and 11 taken along the section lines shown in FIG. 11; and FIG. 12 is a circuit arrangement for the traffic control system of FIGS. 10 and 11.

Referring now to FIGS. 1 through 3, there is shown a time controlled switch mechanism which provides a "quick-on, time delay off" operation for its load circuit. It includes a reversible synchronous clock motor comprising a pair of windings 22 and 23 and associated iron cores 22' and 23', an armature structure within housing 21 and a gear case 21'. This type of motor, operable, for example, at one revolution per minute from a 60-cycle line current, is readily available on the market. By using suitable gearing, the motor may be made to rotate at various revolutions per minute. The motor is securely mounted, by means of screws 24, cylindrical spacers 25, and studs 25', on a main face panel 26 of a U-shaped mounting chassis, the motor shaft 27 extending through an opening in the front of the panel. Side brackets 28 with flanges 28' and mounting holes 29 serve to mount this device in an upright position. A timing disc 31 is fixedly secured on the outer end of the motor shaft 27, the disc having a plurality of equally spaced holes 32 extending entirely around the disc near its periphery. Each of these holes 32 represents a time marker on the clock-rotated disc 31. A first lever or finger 33 is securely affixed to the disc and extends radially therefrom. A second lever or finger 34 is secured on an L-shaped member 34' by a screw 35. Member 34' is rotatably mounted on the clock motor shaft 27 and may be located at any desired angular position relative to the first arm 33 by securing the member 34' to the disc 31 through a selected one of the holes 32 with screw 36. The outer end of the member 34' carries a positioning screw 37 utilized to finely control the angular position of arm 34 which is spring tensioned against the screw 37. The angular spacing between the two lever arms 33, 34 serves to produce a chosen time interval during one revolution of the clock motor shaft.

A first rocker arm 38 is mounted on a shaft 39, which, in turn, is securely mounted in the face panel 26. This rocker arm 38 serves to mount a first mercury switch tube 41, which is designed to carry a heavy load current to a desired load circuit. An extension 42 having an opening 43 therein is fixedly secured on the underside of the rocker arm 38. An L-shaped member having legs 44 and 44' is pivotally mounted in ears 45 extending from the underside of the rocker arm 38. One leg 44' of said member extends through the opening 43 in the extension 42, the outer end of said leg being secured by a chain to a plunger 45 associated with a solenoid 46 mounted on the face panel. The leg 44' is tensioned by spring 47 against the upper surface of the opening 43 in the extension 42.

A control lever including a control arm 48 and extension pin 49 is also pivotally mounted on the shaft 39, the pin 49 extending out through an enlarged opening 51 in the panel 26. The end of control arm 48 is adapted to engage the end of the second leg 44 of the L-shaped member.

A second rocker member 52 is also pivotally mounted on the shaft 39 and serves to mount a second mercury switch tube 53. This member 52 has an opening 54 therein through which pin 49 extends. Rocker member 52 is spring tensioned against the panel 26 and will remain wherever positioned due to friction contact.

An insulation terminal strip is mounted on the panel 26 and carries a resistor 58; the various electrical leads are not shown in FIGS. 1 and 2 since their presence and positioning is deemed to be obvious to those skilled in the art.

Operation of this device is initiated by the momentary closure of a control switch (see FIG. 3) which sends line current from line terminals 56 through the solenoid 46. It is noted that this switch 55 is shown only for illustration purposes since, in actual use of this device, the initiating signal may be obtained from a variety of control sources, including remote signal sources. The plunger 45 moves into the solenoid 46 and pivots the member 44, 44' counter-clockwise so that the end of leg 44 slips off the top of control arm 48, thereby permitting the rocker arm 38 and thus mercury switch 41 to pivot about shaft 39. This action is similar to the tripping of a latch. A stop engages the arm 38 to limit its distance of counter-clockwise rotation as shown in FIG. 1. The mercury switch contacts are thus closed, and a circuit is immediately completed from the line terminals 56 through to an associated load circuit which is represented by resistor 57. A circuit is also completed in parallel with the load 57 through a resistor 58 and through one winding 22 of the clock motor which commences to rotate clockwise as viewed in FIGS. 1 and 3. The resistor 58 ensures that the clock motor is operating at only half torque.

The motor rotates in a clockwise direction until the lever 33 contacts the pin 49 extending through the face panel of the mechanism. The lever arm 33 drives the pin 49 ahead of it, movement of the pin producing a counter-clockwise rotation of the second rocker member 52 about shaft 39 which results in the mercury switch tube 53 tipping and closing its contacts. Movement of pin 49 also causes the control arm 48 to be pivoted about shaft 39 and move down underneath the leg 44.

A circuit is thus closed to the second winding 23 of the synchronous motor through switch 53 and, since there is no resistance in series with this winding, full torque is exerted by this winding, and it overcomes the half-torque of winding 22, thus causing the clock shaft to rotate in a counter-clockwise direction until such time as the second lever 34 encounters the pin 49. The arm 34 drives the pin 49 which in turn pivots the member 52 clockwise about shaft 39 and also pivots the arm 48 clockwise about shaft 39. Pivoting of member 52 causes mercury switch 53 to open its contacts. Arm 48, in pivoting, lifts the member 44 and the associated rocker arm 38 and mercury switch 41, thus pivoting arm 38 and switch 41 about pivot 39 thereby opening the switch contacts of mercury switch 41. As a result, the circuits are opened at mercury switches 41 and 53 to the load circuit and both windings of the clock motor and this mechanism is thus returned to its normal unoperated position awaiting an immediate recycle by the subsequent momentary closure of switch contacts 55 to repeat the above-described operations.

The time that the load current is supplied to the load 57 is determined by the angular spacing between the lever arms 33 and 34, and, as explained above, this angular spacing may be selected so as to be any time period up to the time of one rotation of the disc. In the above example, this time period was one minute, and thus the total elapsed time period can be any period up to approximately two minutes, that is the time it takes lever arm 33 to contact pin 49 and the time it then takes for lever 34 to return the circuit to its normal position.

Figure 6:
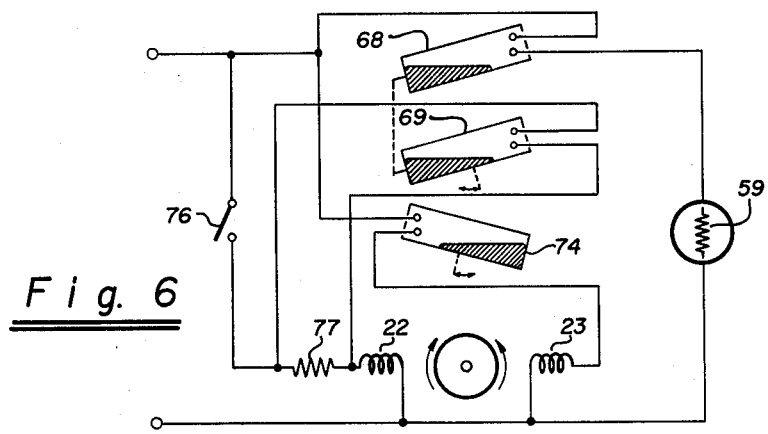
FIG. 6 is a circuit diagram of the time controlled mechanism shown in FIGS. 4 and 5.
Figures 4, 5:
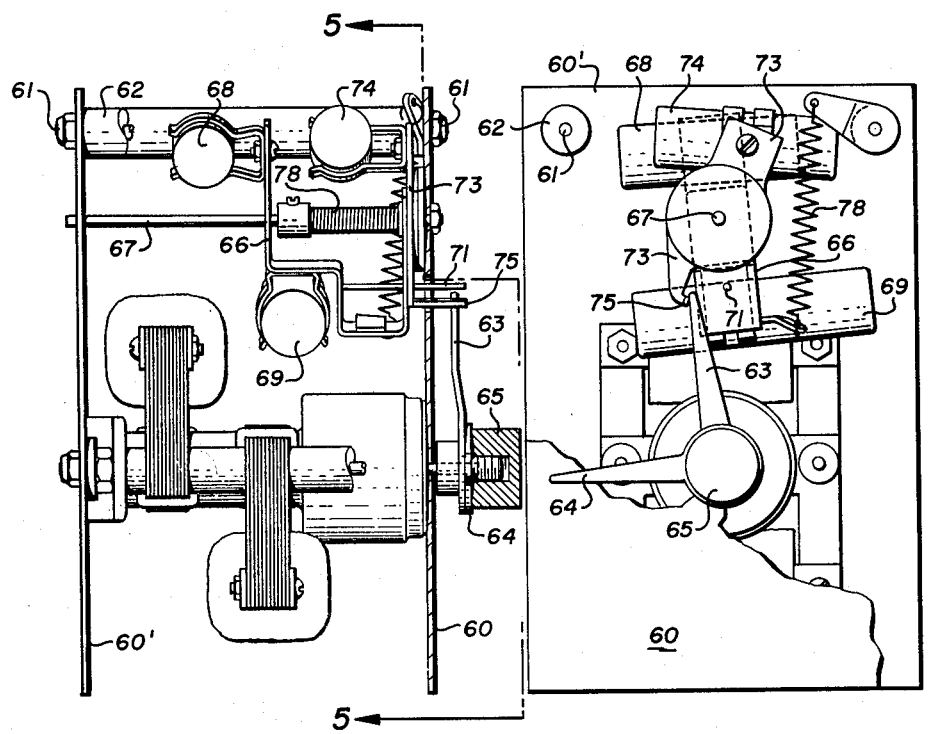
FIG. 4 is a side view of another embodiment of the present invention as utilized in a "time delay on-quick off" type of time controlled mechanism.
FIG. 5 is a front view, partially broken away, of the time controlled mechanism shown in FIG. 4.

Referring now to FIGS. 4 through 6, there is shown a time controlled switch mechanism which produces a "time delay on, quick off" operation for the load circuit. This embodiment also utilizes the above-described two-winding, synchronous reversible clock motor which in this instance is mounted between a front panel 60 and real panel 66' held in rigid spaced-apart position by means of screws 61 and spacers 62. The shaft of the motor carries two lever arms 63 and 64, the angular spacing of which may be adjusted by a loosening and retightening of the lock nut 65. A substantially U-shaped mounting member 66 is pivotally mounted on a shaft 67, this U-shaped member supporting two mercury switch tubes 68 and 69. A first pin 71 is secured in the U-shaped mounting member, the pin 71 extending out through a slot in the face panel 60. A second mounting member 73 is pivotally mounted on the shaft 67, a third mercury switch 74 being securely affixed thereto, said member 73 also having a pin 75 extending through the slot in the front panel 60 of said instrument. Member 73 is frictionally loaded and will remain in the position to which it is rotated by the lever arms 63 and 64.

In operation, a circuit is closed from the line terminals through switch contact 76 (shown for illustration purposes) and through a resistor 77 (secured on a terminal block not shown in FIGS. 4 and 5) connected in series with one winding of the clock motor which starts to rotate at half torque in a clockwise direction. The first lever arm 63 moves away from the pin 75 and contacts pin 71, rocking the pin 71 and mounting member 66 slightly as it passes underneath. The member 66 has a positional tendency provided by the tensioning of spring 78 and is not frictionally loaded as is member 73, and thus returns to the position shown in FIG. 5. This slight rocking of the pin 71 does not produce any effect upon this circuit at this time. The clock motor shaft rotates to the point where the second lever arm 64 contacts the pin 75 and drives the member 73 in a counter-clockwise direction to tip the mercury switch 74 and thus close the line voltage through the second winding 23 of the motor. Since the second winding does not have a resistor in series with it, it produces full torque which overpowers the first winding 22, causing the synchronous motor to rotate in a counterclockwise direction. As the lever arm 63 returns, it contacts pin 71 and rotates member 66 about shaft 67, tipping the mercury switches 68 and 69 to a closed position. Mercury switch 68 closes the work circuit through the load while mercury switch 69 closes a shunting circuit across the resistor 77. At this point, full current flows through both windings of the motor and it stops rotating and remains in a balanced condition with all mercury switch contacts closed. This circuit will remain in this condition with the load energized until the switch contacts 76 are opened to open the circuit to winding 22. The motor is rotated counterclockwise by winding 23 through switch 74 until arm 63 through pin 75 tips the mercury switch 74 to its open position. Also, the arm 63 passes under the pin 71, allowing the switches 68 and 69 to rotate back to their normal open position under urging of spring 78.

The return to normal after opening of switch 76 takes only a moment and the device is ready immediately for recycling.

Figure 7:
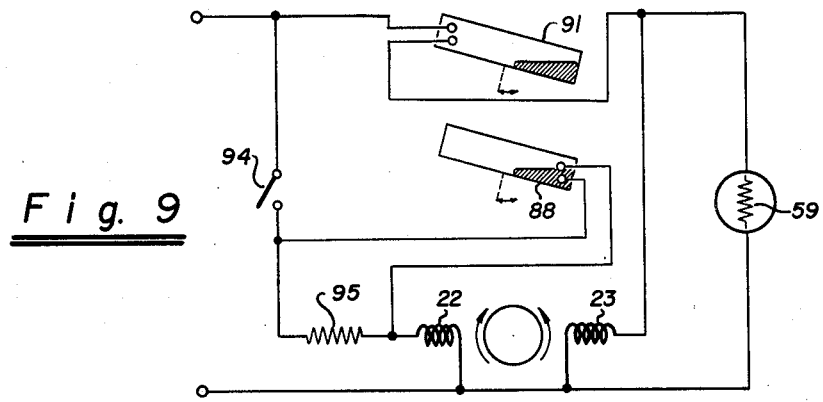
FIG. 7 is a side view of a third embodiment of the present invention.
Figure 8:
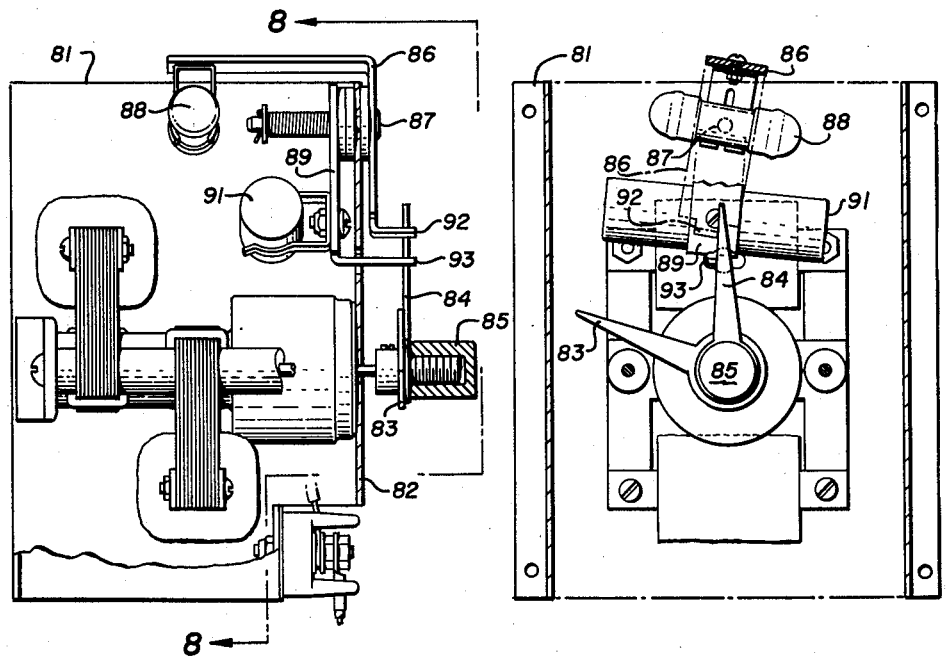
FIG. 8 is a front view of the time controlled mechanism of FIG. 7 taken along section line 8—8.

Referring now to FIGS. 7, 8, and 9, there is shown still another embodiment of the present invention which provides a "time delay on, quick off" operation. This embodiment is similar in result to that of the embodiment shown in FIGS. 4, 5 and 6 but it utilizes one directional timing to reduce minimum time delay. The two-winding, reversible synchronous motor is mounted on the chasis 81 with its motor shaft extending through the front panel 82, there being a pair of lever arms 83 and 84 securely fixed to the shaft. The level arms may be adjusted as to angular spacing, and thus time variation, by loosening the lock knob 85. A frictionally loaded S-shaped bracket 86 is pivotally mounted on the chassis by means of a pivot pin 87, one end of the S-shaped bracket having a first mercury switch tube 88 mounted thereon. An L-shaped bracket 89 is also mounted on the pivot pin 87, this L-shaped bracket being frictionally loaded and serving to mount a second mercury switch tube 91. One end of each of the S-shaped and L-shaped brackets, labeled 92 and 93, respectively, extends out from the front of the panel 82 and is adapted to be engaged by the lever arms 83 and 84 on the clock motor.

In operation, a circuit is closed (through switch 94 for illustration purposes) to the winding 22 of the motor in series with a resistor 95 which at this instance is shunted by switch tube 88 and thus full torque is exerted by this winding on the motor as it rotates in its clockwise direction. After a period of time, defined by the spacing between the two lever arms 83 and 84, the lever arm 83 contacts the two ends 92 and 93 of the brackets and pivots the two mercury switch tubes 88 and 91 to open switch 88 and close switch 91. Since the bracket end 92 is wider than bracket end 93 and is thus contacted and moved first, the control tube 88 will open before the power tube 91 closes. Switch 88, on opening, removes the shunt from resistor 95 and thus winding 22 exerts partial or half torque on the motor shaft. Closure of mercury switch 91 closes the line circuit through to the load 59 and also closes a circuit through the winding 23 of the synchronous motor in parallel with the load circuit. The second winding exerts full torque on the motor which overcomes the half torque of winding 22, thus causing the motor shaft to reverse and rotate counter-clockwise. It is noted that the timing interval was completed when the power tube 91 was closed, and the subsequent operations continue momentarily to prepare this relay device for the next cycle of operation.

The motor shaft moves counter-clockwise until arm 84 engages bracket arm 92 and rotates the bracket 86 sufficiently to tip switch 88 to its closed position, shunting resistor 95 and stalling the motor with full torque being applied by both windings. This stalled condition occurs before arm 84 has moved sufficiently far to move bracket end 93.

This hold or power or condition remains until the control signal is removed (opening of switch 94) to de- energize winding 22. Full counter-clockwise torque turns arm 84 to move bracket end 93 and tip switch 91 to its open position, thus opening the circuit to the load and to the winding 23. The device is then ready for immediate recycle.

Referring now to FIGS. 10 through 12, inclusive, there is shown still another embodiment of the present invention wherein the principle is utilized in a traffic signal control system. A two-winding, reversible, synchronous clock motor 101 of the type described above is mounted on the face panel 102 with the motor shaft extending through the front thereof. A timing disc 103 is securely affixed on the motor shaft, the disc having a relatively deep cut-out portion 104, and, on either side of the deep cut-out portion, shallower cut-out portions 105 and 106 extending along a distance on the perimeter of the disc 103. A plurality of holes 107 are also located near the edge of the disc, the holes being equally spaced and commencing a short distance on either side of the extended cut-out portions 105 and 106. A pair of arcuate members 108 and 109 are fixedly secured to the disc 103 as by screws 111 through slots 112, these arcuate members 108 and 109 being arranged so that they may be moved to any position along the extended cut-away portions 105 and 106, respectively, of the disc 103 on either side of the deep cut-out portion 104. A pair of lever arms 113 and 114 are also mounted on the motor shaft and may be spaced at any desired angular position around the disc 103 by means of screws 115 located in selected ones of the holes 107.

A main mounting shaft 116 extends between the front and rear panels, the shaft pivotally mounting a first L-shaped bracket 117 with frictional positioning tendency on which a first mercury switch tube 118 is mounted. One end 119 of the bracket extends through a slot 121 in the front panel a sufficient distance to provide for engagement with the lever arms 113 and 114.

A U-shaped mercury tube mounting platform 122 is also pivotally mounted on said main shaft 116, one leg 123 thereof having an arcuate under-surface 124 with lips 125 extending downwardly from both ends of the surface (See FIG. 11b). A pair of mercury switch tubes 126 and 127 are secured on the upper surface of the mount 122, each facing in opposite directions. Screws 127' are shown for adjustable positioning of the switch tubes. Two additional mercury switch tube mounting platforms 128 and 129 are pivotally mounted on the main shaft 116, each having a leg 131 and 132, respectively, with an arcuate-shaped undersurface and lips similar to leg 123, and each carrying a pair of oppositely directed mercury switch tubes 133, 134 and 135, 136.

A U-shaped rocker bracket 137 is pivotally mounted at the ends of its two legs 138 and 139 on the main shaft 116, the bracket carrying a rod 141 which extends out through an arcuate shaped slot 142 located in the front panel 102. The rod 141 is arranged so as to ride upon the peripheral edge of the disc 103 and arcuate members 108 and 109 mounted on the disc, and to follow the surfaces of the cut-out portions of the disc. The pin 141 is also arranged to move along the arcuate under-surfaces of the legs 123, 131 and 132 and contact the lips extending therefrom.

The two platforms 122 and 128 are balanced off-center by weights 142 and 143, respectively, and the mounting platform 129 is provided with an extension 144 coupled to a spring 145 which causes the platform 129 to be tension-balanced on either side of center point. A weight could be used in place of spring 145. Stops 146 and 147 are provided for the platforms 122 and 128, respectively, while a slot 148 in the back panel and associated screw 149 provide a stop for the platform 129.

This particular time controlled switch is adapted to operate the red, yellow and green signal lights of a two-direction signal system. The lights have been shown in FIG. 10 mounted with the device merely for illustration purposes since the lights would actually be on light standards. The lights in each of the two sets have been labeled R, Y and G, representing the colors red, yellow and green.

In operation, assume that arm 113 is contacting bracket end 119 in its furthermost clockwise direction and that switch 118 is therefore tilted as shown in FIG. 12. A circuit is closed from the line terminals 155, 156 through a switch 151 and through closed switch tube 118 to one winding 152 of the motor. In addition, a circuit is closed directly through a resistor 153 to the other winding 154. Resistor 154 ensures that only half-torque is applied by winding 154 and, therefore, the motor will now turn counter-clockwise under the full torque of winding 152. At this time, the rod 141 is riding up on the periphery of the disc 103 near the arm 113. Thus, the rod 141 is up near the right-hand end of the arcuate slot 142 and in this position it has engaged the right-hand lip 125 on the under-surface of leg 123 and thus has tipped mercury switches 126 and 127, to the positions shown in FIG. 12. In addition, the rod 141 has engaged the right-hand lip of the under-surface of leg 132 and thus has tipped mercury switch tubes 135 and 136. The mercury switch tubes 133 and 134 are in their normal position (tipped as shown in FIG. 12) with the platform 128 resting on the stop 147 due to the balancing weight 143.

In this position, a circuit may be traced from line terminal 155 through mercury switch 136 and through red light 157 to line terminal 156. In addition, a line circuit may be traced through closed mercury switch 136 and 126 to green light 158'. The line circuits to all the other lights are open.

The disc 103 rotates counter-clockwise and the rod 141 rides along on the periphery of disc 103 and the periphery of arcuate member 108 until the right-hand edge of member 108, which is shown in this illustration as aligned with the left-hand edge of the deep cut-out portion 104, passes under the rod 141. The rod 141 moves down into the deep cut-out portion 104 and also moves down along the arcuate slot 142 from right to left. As the rod 141 moves down to its center position, which is the position in which the device is shown in FIGS. 10 through 11e, the platform 122 returns to its normal position as shown in FIG. 11(b) under the influence of the weight 142 with the platform resting against the stop 146. Platform 129 remains in its tipped position due to the fact it is biased off center by the spring 145, the rod 141 moving along the arcuate under-surface of leg 132.

In this centered position, mercury switch tube 126 is tilted open and thus the circuit to green light 158' is open. However, at the instant switch 126 opened, switch 127 closed, thus closing a circuit to yellow light 159' through mercury tube 136. As the disc 103 continues to rotate, the rod 141 rides up the right-hand edge of the deep cut-out portion 104 and onto the periphery surface of the extended cut-away portion 105 of the disc 103. In so doing, the rod is moved to the left along the arcuate slot 142 and engages the left-hand lip on the under-surface of leg 131, tipping platform 128 and thus causing the two mercury tubes 133 and 134 to tip, closing switch 133 and opening switch 134 which, at this time, do not close any of the light circuits. The rod 141 rides along the cut-out portion 106 of the disc 103 until the arcuate member 109 engages the rod, the rod 141 then riding up on the member 109 and thus moving further to the left in the arcuate slot 142. As the rod so moves, it engages the left-hand lip on the underside of leg 132 and tips the platform 129 and its mercury switch tubes 135 and 136. Switch tube 136 opens the circuit to red light 157 and also to yellow light 159' which are thus extinguished while switch tube 135 closes the circuit to red light 157' and also to green light 158 through switch tube 133.

With these two lights lighted, the rod 141 passes over the periphery of the arcuate member 109 and disc 103 until such time as the arm 114 engages the bracket end 119 and tips the mercury switch 118 to an open position. The circuit to winding 152 is thus opened and winding 154 takes over at half torque to reverse the clock motor and rotate the disc clockwise.

It is noted that one mercury switch tube 118 is utilized to recycle the motor. Two such switches could be used, separate ones to close the circuit to each motor winding, the switch being set to open and close alternately and simultaneously, thus eliminating the need for the resistor 153. However, extreme care in the adjustment of the two switches would be necessary to prevent overlapping of operation which would result in a stalling of the motor.

As the disc 103 rotates clockwise, the rod 141 rides along its periphery until it moves off arcuate member 109 and onto the cut-out portion 106 of the disc and thus moves to the right along the arcuate slot 142. Since platform 129 is held off-center by spring 145, it does not tip back when rod 141 moves back along the under-surface of its leg 132. However, weighted platform 128 follows pin 141 and when the rod 141 drops into the deep cut-out portion 104, the platform 128 returns to its normal position against the stop 147 as shown in FIG. 11(d). In this position, switch tube 133 opens the circuit to green light 158 while switch tube 134 closes a circuit to the yellow light 159. As the disc continues to rotate, the rod 141 rides up the left-hand edge of slot 104 and arcuate member 108 until the rod 141 reaches the periphery surface of the member 108. In doing so, the rod 141 has been moved to the right in arcuate slot 142 and tips both platforms 122 and 129, and thus tilts switch tubes 126 and 127, and tubes 135 and 136, to the positions shown in FIG. 12. The circuit to yellow light 159 is opened at switch 135 and the circuit to red light 157 closed through switch 136. The circuit to red light 157' is also opened at switch 135 and the circuit to green light 158' is closed through switch tube 136.

The above cycle of operations repeats continuously until the power is removed at switch 151. The length of time that the red and green lights are lighted is controlled by the positioning of the arms 113 and 114 in the disc holes 107. One red signal may be made longer or shorter in time than the other red signal by suitable arm placement. The positioning of the arcuate members 108 and 109 on the disc, covering or uncovering the extended cut-out portions 105 and 106, is utilized to select the time period during which the two yellow lights will be lighted, the members 108 and 109 being movable by use of the screws 111 and slots 112.

In all of the above embodiments, it was mentioned that the resistor in series with one winding of the motor resulted in half torque exerted by the winding. It should be noted that "half" torque was used as an illustration and the same results can be obtained at values "less than full" torque. It should also be noted that an equivalent method of reducing torque, rather than the resistors, would be the use of properly tapped field coils on the clock motors to give the "full" and "less than full" values of torque.

Since many changes could be made in the above construction of the novel time control switching circuits of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. A time delay switching mechanism comprising switch contacts for closing a load circuit, a reversible motor having a pair of windings for rotating said motor respectively in opposite direction, means for closing said switch contacts, a first circuit closed by said switch contacts to one of said windings to cause said motor to rotate in one direction, said first circuit including means for limiting the current in said winding so as to exert less than full torque, means including a cam on said motor operated when said motor has rotated a particular distance for closing a second circuit to the other winding which exerts a greater torque on said motor thereby causing said motor to rotate in the opposite direction, and means including a second cam on said motor for opening said switch contacts and said second circuit upon rotation of said motor in said other direction said particular distance.

2. A time delay switching mechanism as claimed in claim 1 wherein said switch contacts and said means for closing the second circuit both include tiltably-mounted mercury switch tubes.

3. A time delay switching mechanism as claimed in claim 2 wherein said means for closing said switch contacts includes a solenoid and a latch mechanism operated thereby, said latch mechanism being set and said switch contact mercury tube being restored to its normal position by said second motor cam.

4. A time delay switching mechanism as claimed in claim 1 including a timing disc mounted on said motor, and means for selectively mounting said cams in time-spaced positions on said disc.

5. A time delay switching mechanism comprising switch contacts for closing a load circuit, and means for operating said switch contacts including a reversible motor having a pair of windings for rotating said motor respectively in opposite directions, a first circuit including a current limiting means closed to one of said windings to cause said motor to rotate in one direction at less than full torque, means including a cam on said motor operated when said motor has rotated a particular distance for closing a second circuit to the other winding which exerts a greater torque on said motor than said first winding thereby causing said motor to rotate in the opposite direction, and means operated by said motor when said motor has rotated a particular distance in said opposite direction to close said switch contacts and to disable said current limiting means in said first circuit thereby causing said first winding to exert a torque on said motor equal to that exerted by said second winding to cause said motor to stop at said switch contacts closing position.

6. A time delay switching mechanism as claimed in claim 5 wherein said switch contacts, said means for closing said second circuit, and said means for disabling said current limiting means each include tiltably-mounted mercury switch tubes.

7. A time delay switching mechanism as claimed in claim 6 wherein said switch contact mercury tube and said disabling mercury switch tube are secured on a rockable bracket, adapted for rocking engagement by a motor-operated cam.

8. A time delay switching mechanism comprising switch contacts for closing a load circuit and means for operating said switch contacts including a reversible motor having a pair of windings for rotating said motor respectively in opposite directions, a first circuit including a current limiting means closed to one of said windings to rotate said motor in one direction, a first switch means for disabling said current limiting means whereby said motor is rotated in said one direction at full torque, means including a cam on said motor operated when said motor has rotated a particular distance in said one direction for operating said first switch means to enable said current limiting means and reduce the torque exerted by said first winding below full value, means including said first cam on said motor operated when said motor has advanced slightly beyond said particular distance in said one direction for closing said switch contacts and for closing a circuit to the other of said windings which exerts full torque on said motor thereby causing said motor to reverse and rotate in the opposite direction, and a second cam on said motor operated when said motor has rotated a particular distance in the reverse direction for operating said first switch means to disable said current limiting means and cause the full torque of said one winding to balance the full torque of said other winding to maintain said motor balanced with said switch contacts closed.

9. A time delay switching mechanism as claimed in claim 8 wherein said switch contacts and said first switch means both include tiltably-mounted mercury switch tubes.

10. A time delay switching mechanism as claimed in claim 9 wherein said means for closing said switch contacts include a tiltable bracket on which said mercury tube switch is mounted adapted for rocking engagement by said motor cams and wherein said means for operating said first switch means includes a second tiltable bracket on which said switch means is mounted adapted for rocking engagement by said motor cams.

11. A continuously cycling time controlled switching mechanism comprising switch contacts, and means for operating said switch contacts including a reversible motor having a pair of windings for rotating said motor respectively in opposite directions, a first circuit means including a current limiting means closed to one of said windings to cause said motor to rotate in one direction at less than full torque, means including a cam on said motor operated when said motor has rotated a particular distance for closing a second circuit to the other winding which exerts a greater torque on said motor than said first winding thereby causing said motor to rotate in the opposite direction, means including a second cam on said motor for opening said second circuit after said motor has rotated said particular distance in the reverse direction to instigate a recycling of the mechanism.

12. A continuously cycling time controlled switching mechanism as claimed in claim 11 wherein said means for closing a circuit to said other winding includes a tiltably-mounted mercury switch tube adapted for tilting by said two motor cams.

13. A time controlled switching mechanism as claimed in claim 12 including a timing disc mounted on said motor and carrying said two cams, and means for positioning said cams at desired positions around said timing disc to vary the time of cycle of said mechanism.

14. A traffic control signal switching mechanism for automatically recycling traffic control signals comprising a plurality of mercury tube switches arranged to control the lighting circuits to the individual traffic lights, means for tiltably mounting said mercury tubes, a clock motor having a pair of windings for rotating said motor respectively in opposite directions, a first circuit means including a current limiting means closed to one of said windings to cause said motor to rotate in one direction at less than full torque, means including a cam on said motor operated when said motor has rotated a particular distance for closing a second circuit to the other winding which exerts a greater torque on said motor than said first winding thereby causing said motor to rotate in the opposite direction, means including a second cam on said motor for opening said second circuit after said motor has rotated said particular distance in the reverse direction to instigate a recycling of the mechanism, and additional cam means controlled by said motor for tilting said light circuit mercury switches during each cycle thereby controlling the traffic lights.

References Cited by the Examiner
UNITED STATES PATENTS

| | | | |
|---|---|---|---|
| 2,539,259 | 1/51 | McCabe | 307—112 |
| 2,605,307 | 7/52 | Ostlind et al. | 307—112 |
| 2,745,288 | 5/56 | Konet et al. | |
| 3,127,549 | 3/64 | Smith | 318—298 |

LLOYD McCOLLUM, *Primary Examiner.*

MILTON O. HIRSHFIELD, ORIS L. RADER,
*Examiners.*